(12) United States Patent
Chen et al.

(10) Patent No.: US 11,137,636 B2
(45) Date of Patent: Oct. 5, 2021

(54) CURVED DISPLAY PANEL AND MANUFACTURING METHOD THEREOF

(71) Applicant: Wuhan China Star Optoelectronics Technology Co., Ltd., Wuhan (CN)

(72) Inventors: Zhenhui Chen, Wuhan (CN); Bingkun Yin, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/846,345

(22) Filed: Apr. 12, 2020

(65) Prior Publication Data

US 2021/0255503 A1 Aug. 19, 2021

(30) Foreign Application Priority Data

Feb. 19, 2020 (CN) .......................... 202010102358.0

(51) Int. Cl.
*G02F 1/1335* (2006.01)
*G02F 1/1368* (2006.01)

(52) U.S. Cl.
CPC ...... *G02F 1/133528* (2013.01); *G02F 1/1368* (2013.01); *G02F 1/133516* (2013.01); *G02F 1/133548* (2021.01)

(58) Field of Classification Search
CPC .............................................. G02F 1/133528
See application file for complete search history.

(56) References Cited

U.S. PATENT DOCUMENTS

| | | | |
|---|---|---|---|
| 2018/0026082 A1* | 1/2018 | Lee .................. | G02F 1/134309 |
| | | | 349/96 |
| 2018/0059450 A1* | 3/2018 | Li ........................ | G02F 1/1343 |
| 2018/0157086 A1* | 6/2018 | Cho ..................... | G02F 1/13363 |
| 2019/0219871 A1* | 7/2019 | Kawahira ............... | G02B 5/30 |
| 2019/0324319 A1* | 10/2019 | Park .................. | G02F 1/133617 |
| 2019/0391444 A1* | 12/2019 | Chu .................. | G02F 1/133617 |

* cited by examiner

*Primary Examiner* — Edmond C Lau
(74) *Attorney, Agent, or Firm* — Nathan & Associates; Menachem Nathan

(57) ABSTRACT

The invention provides a curved display panel and a manufacturing method thereof. The curved display panel includes a glass substrate, a metal wire grid polarizer, an array substrate, a color filter substrate, and a thin film substrate, wherein the metal wire grid polarizer is disposed on the glass substrate, and the array substrate is provided on the metal wire grid polarizer. The present invention uses a metal wire grid polarizer to replace the lower polarizer in the prior art. The metal wire grid polarizer can be placed under the array substrate by using ductility and high temperature resistance of a metal, and prevent the curved display panel from occurrence of light leakage due to the retardation effect of glass by using polarization characteristic of the metal wire grid polarizer, thus improving viewing angles of a liquid crystal display, and increasing brightness uniformity of curved display of the panel.

8 Claims, 3 Drawing Sheets

CURVED DISPLAY PANEL AND MANUFACTURING METHOD THEREOF

BACKGROUND OF INVENTION

Field of Invention

The present application relates to a field of display technology, and in particular, to a curved display panel and a manufacturing method thereof.

Description of Prior Art

At present, many types of display products are present on the market, and requirements for display technology are becoming higher and higher. A curved display panel can provide consumers with a better experience. The curved display panel has glass photoelasticity and causes a delay effect on light after bending. During a curved display state, light passes through an array substrate, and then passes through a color filter (CF) substrate, so glass substrates of the array substrate and the color filter substrate will be impacted by the glass photoelasticity, resulting in light leakage problems, and impacting brightness uniformity.

In the prior art, the curved display panel includes a first curved liquid crystal display panel and a second curved liquid crystal display panel.

In the process of forming the first curved liquid crystal display panel, array and CF processes are performed on the glass substrate, and then the subsequent cell-forming and module processes are performed. In the process of forming the first curved liquid crystal display panel, color filter on array (COA) technology, black matrix on array (BOA) technology, and built-in polarizer technology can be superimposed, and the first curved liquid crystal display panel is set with a certain range of bending radius, within which the curved display is realized.

Because the first curved liquid crystal display panel has glass photoelasticity, it will have a delay effect on light after bending, and cause light leakage. The built-in polarizer can theoretically improve the light leakage problem, but because it uses an organic material, which is not resistant to high temperatures, there are great limitations in the manufacturing process. A metal wire grid polarizer can be used as the built-in polarizer, but it will reflect light due to surface reflection, so they are not used as polarizers in general displays. The first curved liquid crystal display panel is difficult to be formed with a curvature radius less than 150 mm.

In the process of forming the second curved liquid crystal display panel, array and CF processes are performed on the glass substrate, and then the subsequent cell-forming and module processes are performed. In the process of forming the second curved liquid crystal display panel, color filter on array (COA) technology, black matrix on array (BOA) technology, and built-in polarizer technology can also be superimposed. The second curved liquid crystal display panel is a flexible liquid crystal display panel. Since the flexible liquid crystal display panel uses an organic material as a base material, there are great limitations in a high temperature process. For example, processes for low temperature polysilicon (LTPS) and ion activation of N-type transistor (NMOS) are as high as 590° C., which exceeds thermal decomposition temperatures of most organic materials. Moreover, the first liquid crystal display panel fabricated on the film substrate is easily impacted by water vapor and air, and the stability of the display is greatly challenged.

SUMMARY OF INVENTION

An object of the present invention is to provide a curved display panel and a method of manufacturing the curved display panel, in order to solve the technical problems that the curved display panel using a glass substrate in the prior art cannot easily achieve a small bending radius and causes light leakage after bending.

In order to achieve the above object, the present invention provides a curved display panel including a glass substrate and an array substrate; a metal wire grid polarizer disposed on the glass substrate; and an array substrate disposed on the metal wire grid polarizer.

Further, the metal wire grid polarizer includes: a metal plate; and at least one strip-shaped through hole penetrating the metal plate, wherein a metal wire is formed between adjacent ones of strip-shaped through holes.

Further, a diameter of each of the strip-shaped through holes is 20-500 nm.

Further, the metal wire has a duty ratio of 0.1 to 0.9 and a thickness of 150-250 nm.

Further, the metal wire grid polarizer is made of a material including at least one of aluminum, silver, and gold.

Further, the curved display panel further includes: a liquid crystal layer disposed on the array substrate; a color filter substrate disposed on the liquid crystal layer; a barrier layer disposed on the color filter substrate; a thin film substrate disposed on the barrier layer; and a polarizer disposed on the thin film substrate.

Further, the curved display panel further includes: an optical retarder disposed between the thin film substrate and the polarizer.

Further, the curved display panel further includes: a planarization layer disposed between the metal wire grid polarizer and the array substrate, and filling a gap of the metal wire grid polarizer.

In order to achieve the above object, the present invention also provides a method of manufacturing a curved display panel, including the following steps: a metal wire grid polarizer preparation step of forming a metal plate on an upper surface of a glass substrate; a patterning process step of patterning the metal plate to form a metal wire grid polarizer; and an array substrate preparation step of forming an array substrate on an upper surface of the metal wire grid polarizer.

Further, in the patterning process step, the metal plate is patterned by nano-imprinting, photolithography, and etching.

Technical effect of the present invention is to provide a curved display panel and a manufacturing method thereof, using a metal wire grid polarizer to replace the lower polarizer in the prior art. On the one hand, the metal wire grid polarizer can be placed under the array substrate by using ductility and high temperature resistance of a metal; on the other hand, the metal wire grid polarizer disposed under the array substrate prevents the curved display panel from occurrence of light leakage due to the retardation effect of glass by using polarization characteristic of the metal wire grid polarizer, thus improving viewing angles of a liquid crystal display, and increasing brightness uniformity of curved display of the panel. Meanwhile, by using a thin film substrate instead of a glass substrate supporting the color filter substrate, the curvature radius of the curved display panel can be smaller than that of the existing curved display panel, and the curved display effect of the display panel can be effectively realized.

BRIEF DESCRIPTION OF DRAWINGS

The following detailed description of specific embodiments of the present application will make the technical solutions and other beneficial effects of the present application obvious in conjunction with the accompanying drawings.

Figure 1:
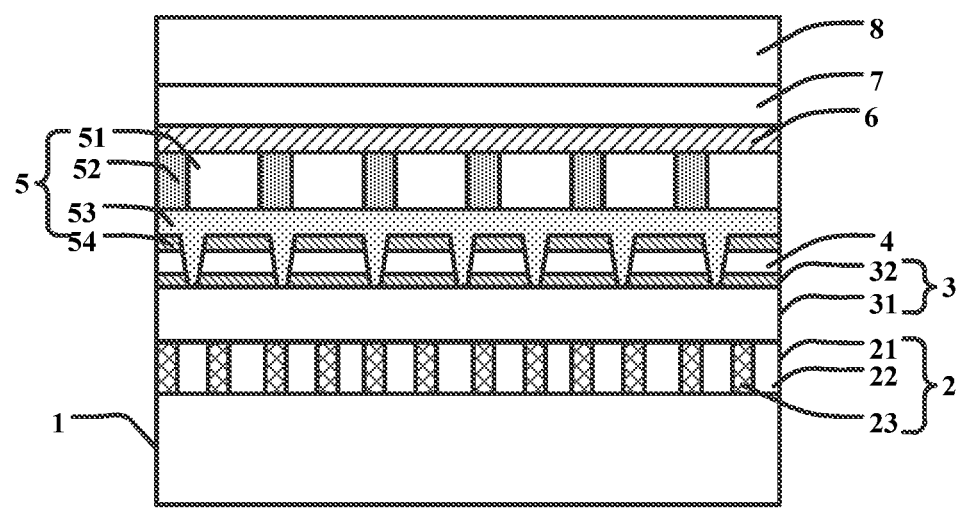
FIG. 1 is a schematic structural diagram of a curved display panel according to Embodiment 1.

Elements in the drawings are designated by reference numerals listed below.

1 glass substrate; 2 metal wire grid polarizer; 3 array substrate; 4 liquid crystal layer; 5 color film substrate; 6 barrier layer; 7 thin film substrate; 8 polarizer; 9 optical retarder; 10 planarization layer; 21 metal plate; 22 through hole; 23 metal wire; 31 substrate layer; 32 first PI layer; 51 pixel definition layer; 52 black matrix; 53 support layer; 54 second PI layer.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of the present invention, it is to be understood that the terms "center", "longitudinal", "transverse", "length", "width", "thickness", "upper", "lower", "front", "post", "left", "right", "vertical", "horizontal", "top", "bottom", "inside", "outside", etc. demonstrating the orientation or positional relationship of the indications is based on the orientation shown in the drawings Or, the positional relationship is merely for the convenience of the description of the present invention and the simplification of the description, and is not intended to imply that the device or the component of the present invention has a specific orientation and is constructed and operated in a specific orientation, thus being not to be construed as limiting the present invention. Moreover, the terms "first" and "second" are used for descriptive purposes only and are not to be construed as indicating or implying a relative importance or not to implicitly indicate a number of technical features indicated. Thus, features defined by "first" or "second" may include one or more of the described features either explicitly or implicitly. In the description of the present invention, the meaning of "a plurality" is two or more unless specifically defined otherwise.

In the present invention, unless otherwise expressly stated and limited, the formation of a first feature over or under a second feature in the description that follows may include embodiments in which the first and second features are formed in direct contact, and may also include embodiments in which additional features may be formed between the first and second features, such that the first and second features may not be in direct contact. Moreover, the first feature "above", "over" and "on" the second feature includes the first feature directly above and above the second feature, or merely indicating that the first feature is at a level higher than the second feature. The first feature "below", "under" and "beneath" the second feature includes the first feature directly below and obliquely below the second feature, or merely the first feature has a level lower than the second feature.

The following disclosure provides many different embodiments or examples for implementing different structures of the present invention. In order to simplify the disclosure of the present invention, the components and arrangements of the specific examples are described below. Of course, they are merely examples and are not intended to limit the present invention. In addition, the present invention may repeat reference numerals and/or reference letters in the various embodiments, which are for the purpose of simplicity and clarity, and do not indicate the relationship between the various embodiments and/or arrangements discussed. Moreover, the present invention provides examples of various specific processes and materials, but one of ordinary skill in the art will recognize the use of other processes and/or the use of other materials.

Embodiment 1

As shown in FIG. 1, this embodiment provides a curved display panel, which is a curved liquid crystal display panel including a glass substrate 1, a metal wire grid polarizer 2, an array substrate 3, a liquid crystal layer 4, a color filter substrate 5, a barrier layer 6, the thin film substrate 7, and the polarizer 8.

The metal wire grid polarizer 2 is provided on a glass substrate 1. The metal wire grid polarizer 2 includes a metal plate 21 and a strip-shaped through hole 22. A material of the metal wire grid polarizer 2 includes at least one of aluminum, silver, and gold, which has good ductility and polarization characteristics.

At least one strip-shaped through hole 22 penetrates the metal plate 21 and has a diameter of 20-500 nm. Central axes of the strip-shaped through holes are parallel to each other, and the strip-shaped through holes are parallel to each other; wherein a metal wire 23 is formed between adjacent ones of the strip-shaped through holes. The metal wire has a duty ratio of 0.1 to 0.9 and a thickness of 150-250 nm.

The array substrate 3 is disposed on a metal wire grid polarizer 2. The array substrate 3 includes a substrate layer 31 and a first PI layer 32 disposed on an upper surface of the metal wire grid polarizer 2. The substrate layer includes a plurality of thin film transistors, a passivation layer, a planarization layer, and the like, wherein the first PI layer 32 is disposed on the planarization layer (not shown).

The liquid crystal layer 4 is provided on the array substrate 3.

The color filter substrate 5 is provided on the liquid crystal layer 4. The color filter substrate 5 includes a pixel definition layer 51, a black matrix 52, a support layer 53, and a second PI layer 54. The pixel definition layer 51 includes a red sub-pixel (R), a green sub-pixel (G), and a blue sub-pixel (B). The black matrix 52 is disposed between two sub-pixels. The support layer 53 is provided on lower surfaces of the pixel definition layer 51 and the black matrix 52. The support layer 53 includes a support substrate layer and a support pillar. The support substrate layer is attached to the lower surfaces of the pixel definition layer 51 and the black matrix 52. The support pillar protrudes from the substrate layer and is connected to an upper surface of the first PI layer 31. The second PI layer 54 is provided on the lower surface of the support substrate layer.

The barrier layer 6 is provided on an upper surface of the color filter substrate 5. The barrier layer 6 may be a single-layered buffer layer and made of silicon nitride and/or silicon oxide. Alternatively, the barrier layer 6 includes a stacked structure of at least one PI layer and a buffer layer, and a number of layers of the stacked structure can be adjusted according to actual conditions. In this embodiment, the barrier layer 6 is mainly configured to isolate water and oxygen and prolong the service life of the display panel.

The thin film substrate 7 is provided on an upper surface of the barrier layer 6 and is preferably made of polyimide. The polarizer 8 is provided on the thin film substrate 7, which has a good bending effect. In this embodiment, the thin film substrate 7 is used instead of a glass substrate supporting the color filter substrate, the curvature radius of the curved display panel can be smaller than that of the existing curved display panel, and the curved display effect of the display panel can be effectively realized.

This embodiment provides a curved display panel. In operation, a backlight source first passes through a glass substrate, then passes through a metal wire grid polarizer, and then enters a liquid crystal layer. The light entering the liquid crystal layer is a completely polarized light, so that the light coming out from a side of the color filter substrate is also uniform. Therefore, due to the polarization characteristics of the metal wire grid polarizer, light can be transmitted through the array substrate, the liquid crystal layer, and the color filter substrate sequentially without being impacted by the photoelasticity of a curved glass, thus alleviating the light leakage problem of curved display panels and increasing the brightness uniformity of the surface display. The curved display panel provided in this embodiment retains the glass substrate on a side of the array substrate in combination with the thin film substrate on a side of the color filter substrate, which is easier to achieve bending than the traditional display panel.

Figure 2:
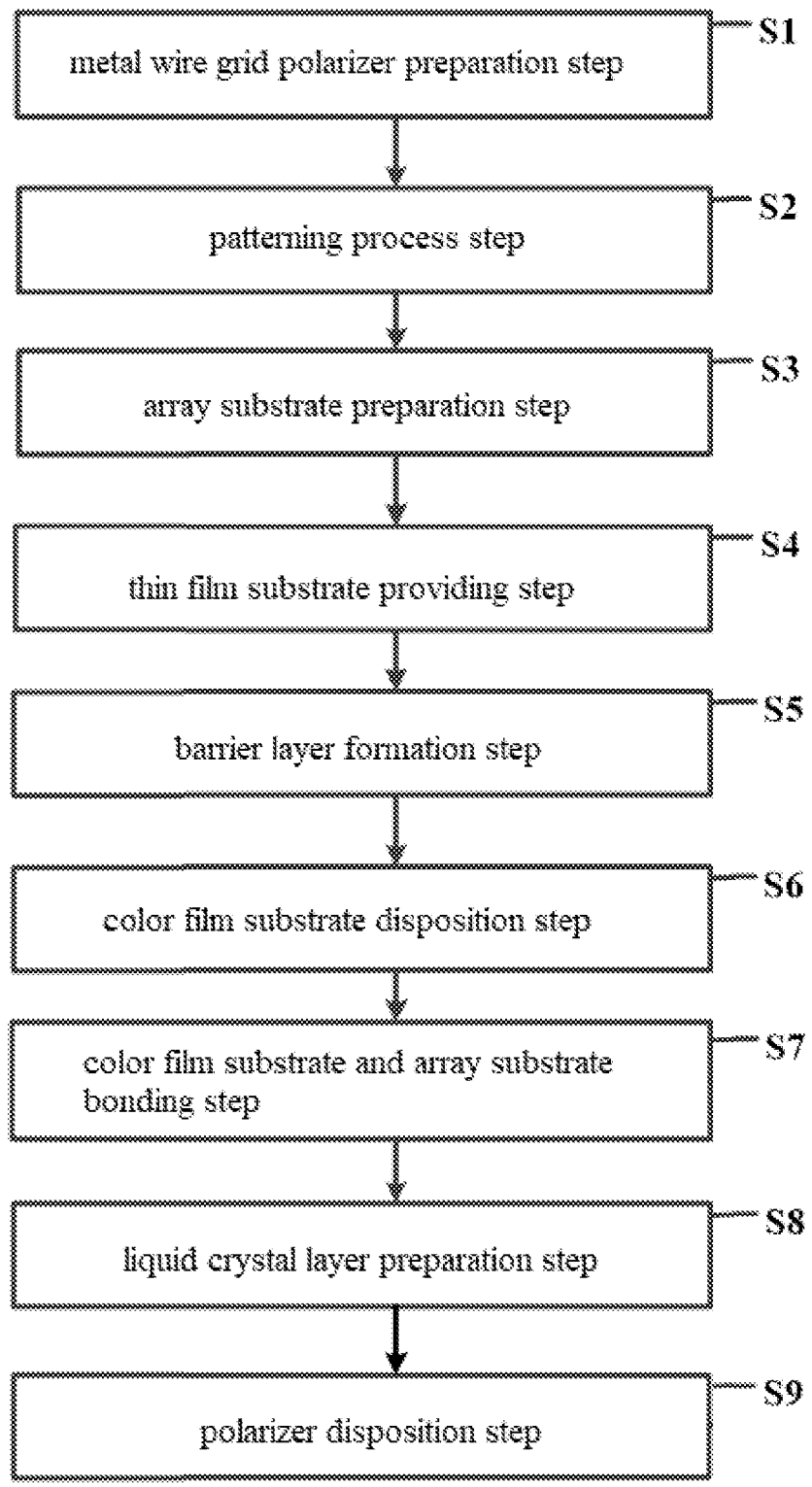
FIG. 2 is a flowchart of a method of manufacturing a curved display panel according to Embodiment 1.

As shown in FIG. 2, this embodiment further provides a method of manufacturing a curved display panel, which includes the following steps S1 to S9.

S1 a metal wire grid polarizer preparation step of forming a metal plate on an upper surface of a glass substrate;

S2 a patterning process step of patterning the metal plate to form a metal wire grid polarizer, wherein the metal wire grid polarizer is formed by nano-imprinting, photolithography, and etching, and the manufacturing process is simple, such that, compared with the metal wire grid polarizer obtained by using conventional etching, the metal wire grid polarizer prepared in this embodiment has a more regular structure and a better aspect ratio, which can improve the performance of the metal wire grid polarizer and enhance the polarization effect;

S3 an array substrate preparation step of forming an array substrate on an upper surface of the metal wire grid polarizer, wherein the array substrate includes a substrate layer and a first PI layer, the substrate layer includes a plurality of thin film transistors, a passivation layer, and a planarization layer, and the first PI layer is disposed on the planarization layer;

S4 a thin film substrate providing step of providing a thin film substrate, which has a good bending effect;

S5 a barrier layer formation step of forming a barrier layer on an upper surface of the thin film substrate, wherein the barrier layer may be a single-layered buffer layer and made of silicon nitride and/or silicon oxide, or alternatively, the barrier layer includes a stacked structure of at least one PI layer and a buffer layer, and a number of layers of the stacked structure can be adjusted according to actual conditions, and wherein in this embodiment, the barrier layer is mainly configured to isolate water and oxygen and prolong the service life of the display panel;

S6 a color film substrate disposition step of disposing a color film substrate on an upper surface of the barrier layer;

The color filter substrate further includes the following processes:

a pixel definition layer, a black matrix, a support layer, and a second PI layer are formed on the upper surface of the barrier layer, wherein, in the process of forming the pixel definition layer, the pixel definition layer includes a red sub-pixel (R), a green sub-pixel (G), and a blue sub-pixel (B), a gap is provided between adjacent ones of the sub-pixels, the black matrix is formed in the gap to block light, the support layer is prepared on the pixel definition layer and the upper surface of the black matrix, the support layer is patterned to form a support substrate layer and a support pillar, the support pillar protrudes from the substrate layer and is attached to the upper surfaces of the pixel definition layer and the black matrix, and the second PI layer is prepared on an upper surface of the support substrate layer;

S7 a color film substrate and array substrate bonding step of flipping over the color film substrate to attach to the upper surface of the array substrate, wherein the support pillar abuts the first PI layer, that is, the support pillar is used to support the color filter substrate and other components, and the color filter substrate and the array substrate form a cavity;

S8 a liquid crystal layer preparation step of injecting liquid crystal into the cavity to form a liquid crystal layer, wherein the array substrate, the liquid crystal layer, and the color filter substrate together constitute a liquid crystal cell; and S9 a polarizer disposition step of disposing a polarizer on a surface of the thin film substrate away from the color filter substrate to form a large panel structure.

In this embodiment, in addition to preparing the liquid crystal layer by the above method, the method of manufacturing the curved display panel may also form a liquid crystal layer on the upper surface of the array substrate by coating, and this embodiment is not particularly limited. In addition, the method of manufacturing the curved display panel includes other steps in addition to the above steps, which are not described in detail herein for brevity.

This embodiment provides a method of manufacturing a curved display panel. In operation of the curved display panel, a backlight source first passes through a glass substrate, then passes through a metal wire grid polarizer, and then enters a liquid crystal layer. The light entering the liquid crystal layer is completely polarized light, so that the light coming out from a side of the color filter substrate is also uniform. Therefore, due to the polarization characteristics of the metal wire grid polarizer, light can be transmitted through the array substrate, the liquid crystal layer, and the color filter substrate sequentially without being impacted by the photoelasticity of a curved glass, thus alleviating the light leakage problem of curved display panels and increasing the brightness uniformity of the surface display. The curved display panel provided in this embodiment retains the glass substrate on a side of the array substrate in combination with the thin film substrate on a side of the color filter substrate, which is easier to achieve bending than the traditional display panel.

Technical effect of the present invention is to provide a curved display panel and a manufacturing method thereof, using a metal wire grid polarizer to replace the lower polarizer in the prior art. On the one hand, the metal wire grid polarizer can be placed under the array substrate by using ductility and high temperature resistance of a metal; on the other hand, the metal wire grid polarizer disposed under the array substrate prevent the curved display panel from occurrence of light leakage due to the retardation effect of glass by using polarization characteristic of the metal wire grid polarizer, thus improving viewing angles of a liquid crystal display, and increasing brightness uniformity of curved display of the panel. Meanwhile, by using a thin film substrate instead of a glass substrate supporting the color filter substrate, the curvature radius of the curved display panel can be smaller than that of the existing curved display panel, and the curved display effect of the display panel can be effectively realized.

Embodiment 2

This embodiment provides a curved display panel and a manufacturing method thereof, including all the technical solutions of Embodiment 1. The difference from Embodiment 1 is that the curved display panel according to this embodiment further includes an optical retarder, which is provided between the thin film substrate and the film substrate. The method of manufacturing the curved display panel in this embodiment further includes an optical retarder disposition step after the thin film substrate providing step, which is not described in detail herein.

Figure 3:
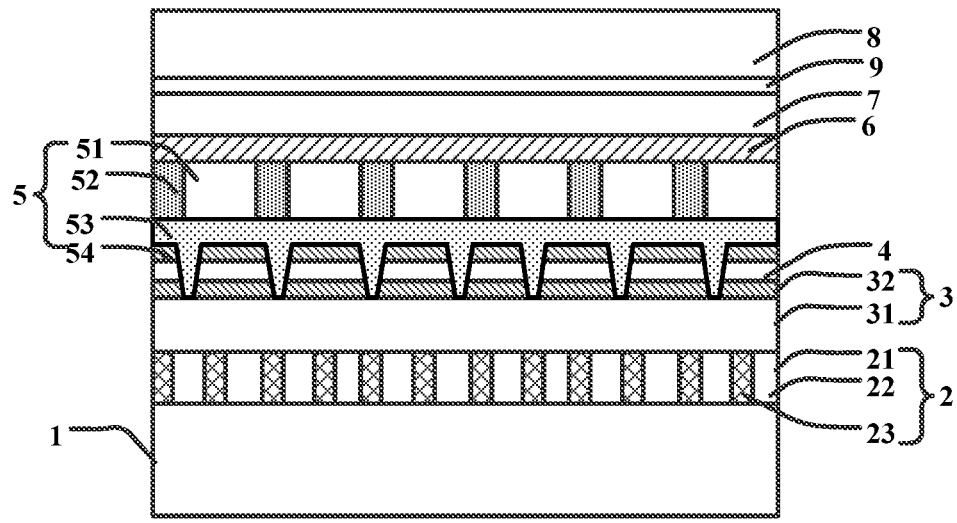
FIG. 3 is a schematic structural diagram of a curved display panel according to Embodiment 2.

As shown in FIG. 3, this embodiment further includes an optical retarder 9 provided between the thin film substrate and the polarizer. Due to the probable optical retardation effect of the thin film substrate 7, the viewing angle becomes smaller, causing the technical problem of light leakage in the dark state. Therefore, by providing an optical retarder 9 on the upper surface of the thin film substrate 7, the viewing angle can be improved, the technical problem of light leakage in the dark state can be eliminated, and in addition, the optical retarder can also be integrated into the upper polarizer to improve the display contrast of the curved display panel.

Embodiment 3

This embodiment provides a curved display panel and a manufacturing method thereof, including all the technical solutions of Embodiment 2. The difference from Embodiment 2 is that the curved display panel further includes a planarization layer, which is disposed between the metal wire grid polarizer and the array substrate, and fills a gap of the metal wire grid polarizer. The method of manufacturing the curved display panel further includes, after the patterning step, a planarization layer preparation step of filling the upper surface and the gap of the metal wire grid polarizer with a transparent insulating material to form the planarization layer.

Figure 4:
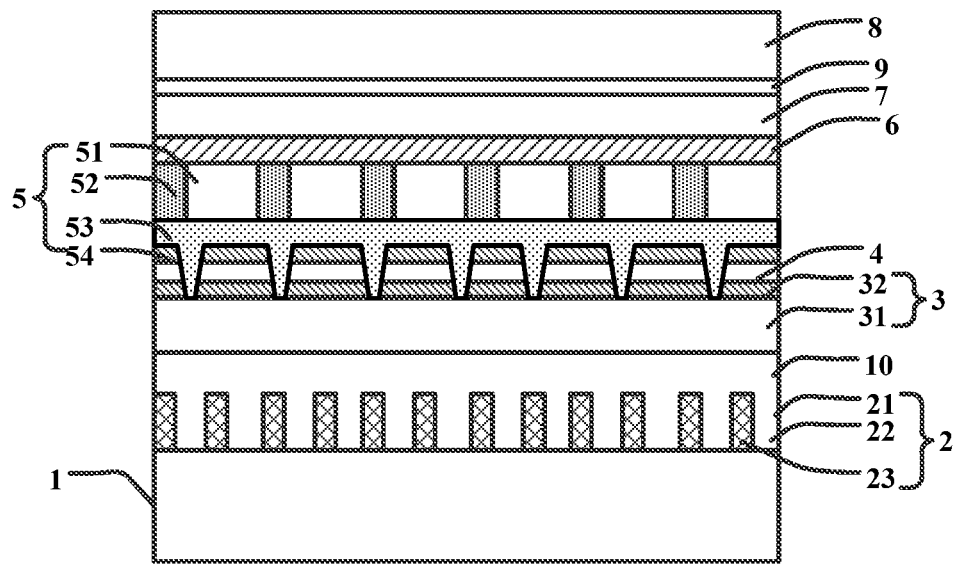
FIG. 4 is a schematic structural diagram of a curved display panel according to Embodiment 3.

As shown in FIG. 4, this embodiment further includes a planarization layer 10 provided between the metal wire grid polarizer 2 and the array substrate 1 and filling a gap between the metal wire grid polarizer 2. The planarization layer 10 is preferably made of a transparent insulating material, which not only flattens the metal wire grid polarizer 2, but also has good light transmittance, thereby improving the flatness of the array substrate and the color filter substrate after bonding to form a cell.

In the above embodiments, the descriptions of each embodiment have their own emphasis. The parts that are not described in detail in an embodiment can be referred to the detailed descriptions in other embodiments above, which will not be repeated herein for brevity.

The curved display panel and the manufacturing method thereof provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A curved display panel, comprising:
   a glass substrate;
   a metal wire grid polarizer disposed on the glass substrate;
   an array substrate disposed on the metal wire grid polarizer;
   a pixel definition layer disposed above the array substrate;
   a support layer disposed between the array substrate and the pixel definition layer; and
   a black matrix disposed between two sub-pixels of the pixel definition layer,
   wherein the support layer comprises a support substrate layer and a plurality of support pillars, the support substrate layer is attached to a lower surface of the pixel definition layer, and the plurality of support pillars protrudes from the support substrate layer and penetrates a portion of the array substrate, wherein an orthographic projection of at least one of the support pillars on the glass substrate is offset from an orthographic projection of the black matrix on the glass substrate.

2. The curved display panel according to claim 1, wherein the metal wire grid polarizer comprises:
   a metal plate; and
   at least one strip-shaped through hole penetrating the metal plate,
   wherein a metal wire is formed between adjacent ones of strip-shaped through holes.

3. The curved display panel according to claim 1, wherein the metal wire grid polarizer is made of a material comprising at least one of aluminum, silver, and gold.

4. The curved display panel according to claim 1, further comprising:
   a liquid crystal layer disposed on the array substrate;
   a color filter substrate disposed on the liquid crystal layer;
   a barrier layer disposed on the color filter substrate;
   a thin film substrate disposed on the barrier layer; and
   a polarizer disposed on the thin film substrate.

5. The curved display panel according to claim 3, further comprising:
   an optical retarder disposed between the thin film substrate and the polarizer.

6. The curved display panel according to claim 5, further comprising:
   a planarization layer disposed between the metal wire grid polarizer and the array substrate, and filling a gap of the metal wire grid polarizer.

7. A method of manufacturing a curved display panel, comprising the following steps:
   a metal wire grid polarizer preparation step of forming a metal plate on an upper surface of a glass substrate;
   a patterning process step of patterning the metal plate to form a metal wire grid polarizer;
   an array substrate preparation step of forming an array substrate on an upper surface of the metal wire grid polarizer;
   a support layer preparation step of forming a support layer above the array substrate; and
   a pixel definition layer preparation step of forming a pixel definition layer above the support layer,
   wherein the support layer comprises a support substrate layer and a plurality of support pillars, the support substrate layer is attached to a lower surface of the pixel definition layer, and the plurality of support pillars protrudes from the support substrate layer and penetrates a portion of the array substrate, and wherein a black matrix is disposed between two sub-pixels of the pixel definition layer, and an orthographic projection of at least one of the support pillars on the glass substrate is offset from an orthographic projection of the black matrix on the glass substrate.

8. The method of manufacturing the curved display panel according to claim 7, wherein in the patterning process step, the metal plate is patterned by nano-imprinting, photolithography, and etching.

* * * * *